United States Patent

Draxler et al.

[11] Patent Number: 6,063,322
[45] Date of Patent: *May 16, 2000

[54] METHOD FOR MANUFACTURING SHAPED BODIES FROM HARD FERRITES

[75] Inventors: Waldemar Draxler, Markgroeningen; Wilfried Aichele, Winnenden; Uwe Laukant, Schorndorf; Horst Boeder, Sindelfingen, all of Germany

[73] Assignee: Robert Bosch GmbH, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/765,867
[22] PCT Filed: Sep. 2, 1995
[86] PCT No.: PCT/DE95/01189
§ 371 Date: Jan. 10, 1997
§ 102(e) Date: Jan. 10, 1997
[87] PCT Pub. No.: WO96/09998
PCT Pub. Date: Apr. 4, 1996

[30] Foreign Application Priority Data

Sep. 27, 1994 [DE] Germany .............................. 44 34 471

[51] Int. Cl.$^7$ .................................................... B29C 71/04
[52] U.S. Cl. ........................... 264/428; 264/611; 264/612
[58] Field of Search .............................. 264/428, 63, 611, 264/612, 645, 656, 657, 670

[56] References Cited

U.S. PATENT DOCUMENTS

| | | | |
|---|---|---|---|
| 3,300,411 | 1/1967 | Wickam et al. | 264/612 |
| 3,387,066 | 6/1968 | Martin et al. | 264/428 |
| 3,596,350 | 8/1971 | Steingroever | 264/428 |
| 3,602,986 | 9/1971 | Conwicke | 264/428 |
| 4,457,851 | 7/1984 | Tabaru | 254/428 |
| 5,698,145 | 12/1997 | Narutani et al. | 264/612 |

FOREIGN PATENT DOCUMENTS

| | | |
|---|---|---|
| 0115104 | 8/1994 | European Pat. Off. . |
| 3626360 | 2/1988 | Germany . |
| 4033952 | 5/1992 | Germany . |
| 56-157474 | 12/1981 | Japan . |

OTHER PUBLICATIONS

Abstract JP 567474 Dec. 4, 1981.

G. Heimke et al.: "Ferrite Permanent Magnets from Prefabricated Powders". In: Powder Metallurgy International, vol. 5, No. 1, 1973, pp. 28 ff.

Primary Examiner—Christopher A. Fiorilla
Attorney, Agent, or Firm—Kenyon & Kenyon

[57] ABSTRACT

A method for producing shaped bodies from hard ferrites, includes (a) providing a powder of hard ferrite material having a fine particle size; (b) adding to the powder a plastifying and bonding agent which comprises (a) at least one of cyclododecane, cyclododecanol, and stearyl alcohol and (b) stearic acid to provide a mixture; (c) shaping the mixture into a blank; (d) heating at a temperature effective to remove the plastifying and bonding agent from the blank; and (e) subsequently heating the blank to a temperature effective to sinter the powder. The method is suitable for the production of magnets, in particular segmental magnets.

26 Claims, No Drawings

METHOD FOR MANUFACTURING SHAPED BODIES FROM HARD FERRITES

BACKGROUND OF THE INVENTION

The manufacturing of shaped bodies from fine-particle powdered materials is known, wherein these are mixed with plastifying and bonding agents and are shaped into "blanks," from which the plastifying and bonding agents are removed through heating before the powdered particles are sintered together by heating them to sintering temperatures, resulting in the desired formed body. Ferrite permanent magnets are also manufactured with sintering methods. Based on the publication of G. Heimke and J. D. Nye, Powder Metallurgy International, Vol. 5, No. 1, 1973, pages 28 ff., the powders are pressed while dry or wet (meaning in watery suspension), wherein the best magnetic qualities are achieved through wet pressing in the magnetic field. Furthermore, according to the aforementioned publication, the ferrite particles can also be incorporated into plastic materials. The magnets made from these plastic-bonded ferrite particles are normally produced through extrusion or injection-molding. Nothing is said about the type of plastic materials. This type of magnet is not sintered, but only cured.

In the DE-A1-36 26 360, an injection-molding process for manufacturing anisotropic permanent magnets is described. In that case, a "permanent-magnetic powder" is mixed with plastic materials and the mixture is granulated. The granulate is injected into the desired mold in the magnetic field, the shaped bodies are sintered and, if necessary, reworked. Finally, the sintered shaped bodies are magnetized. Mentioned as plastic materials obviously functioning as plastifying and bonding agents are "polyamides, polyurethanes, polypropylene, polyethylene, polystryrene, etc," without providing reproducible data of the characteristic values that can be achieved with this.

In the DE-C1-40 33 952, a binary binder system along the lines of the solid polymer solutions is proposed for processing metal powder through injection-molding. The production of magnets based on this method is not mentioned. The binary binder system consists of polyethylene and/or polypropylene as polymeric binder component, as well as cyclododecane, cyclododecanon, cyclododecanol and/or stearyl alcohol as low-molecular binder component.

In EP-A-0 115 104, a method for processing sintered, anorganic shaped bodies is described, which is also not focused on the production of magnets. Carbides, nitrides, borides and sulfides are named as base materials in addition to metallic and oxidic materials. The formed bodies are produced through injection-molding or extruding. One essential characteristic of the process is the use of a mixture, consisting of an oxidized wax and stearic acid as plastifying and bonding agent.

When producing permanent magnets according to the sintering method, it is desirable in the interest of good mechanical and magnetic qualities to produce shaped bodies with high packing density, uniform distribution and useful orientation of the powder particles. For one of the known methods, the wet pressing, the magnetizable particles that are as a rule added as a watery dispersion are pressed into a blank in a magnetic field. The particles then have an anisotropic orientation, which is advantageous for the later magnetizing of the sintered shaped bodies. Following pressing, the particles are initially demagnetized again, because magnetized blanks without plastifying and bonding agents are mechanically very sensitive. As a result of this sensitivity, the blanks must be demagnetized while still in the mold. However, the blanks remain relatively sensitive even after demagnetization, which complicates their handling in particular for the production on an industrial scale. On the other hand, wet-pressed blanks without plastifying and bonding agents have a comparably low tendency to form cracks during the sintering.

In contrast, blanks that are produced with another known method, that is by adding organic plastifying and bonding agents through deformation under magnetic orientation, have sufficient mechanical stability for the further processing and are therefore easy to handle even before the sintering. Like the wet-pressed blanks, they are as a rule demagnetized prior to the sintering. However, in contrast to the wet-pressing, this can take place outside of the mold because of their higher mechanical stability, which permits a more speedy operating sequence. On the other hand, the organic plastifying and bonding agents must be removed from the blank prior to the sintering. If this is not done with sufficient care, the blank disintegrates due to developing gas and the particles will not sinter later on. The "removal of the bonding agents" is a critical production step, which should be kept as short as possible for economic reasons. Finally, the blanks produced by using organic plastifying and bonding agents have a higher tendency to form cracks during the sintering than the wet-pressed ones.

SUMMARY OF THE INVENTION

The method in accordance with the present invention avoids the aforementioned disadvantages of the Prior Art. The present invention provides a method for producing shaped bodies from hard ferrites during which fine-particle hard ferrite powders are formed into a blank following the addition of plastifying and bonding agents, the plastifying and bonding agents are removed from the blank through heating and, subsequently, the blank is heated to sintering temperatures, characterized in that (a) cyclododecane, cyclododecanol, stearyl alcohol or mixtures of two or all of these substances together with (b) stearic acid are used as plastifying and bonding agents. The method produces magnets which are isotropic or anisotropic magnets. It is particularly suited for the production of magnets, in particular of segmental magnets, such as the ones used in electric motors. The blanks can be produced through injection-molding, extruding or pressing, advisably in an orienting magnetic field. The extruding permits a continuous processing of the hard ferrites. With this, it is possible, for example, to produce without problems segmental magnets with an overlap angle of >140°. The blanks are sufficiently stable mechanically for all further processing steps, regardless of which of the aforementioned forming processes was used to produce them. The plastifying and bonding agents according to the invention, can be removed faster and with more care from the blanks prior to the sintering, than the plastifying and bonding agents according to the Prior Art. They do not hinder the orientation of the ferrite particles in the magnetic field during the production of the blanks, and the orientation once imprinted is retained even during the "baking out" or "de-bonding," meaning the removal of the bonding and plastifying agents by heating. The blanks distinguish themselves through a high form stability. That is why the formed bodies as a rule do not have to be reworked after the sintering. This is particularly true for formed bodies produced by pressing. Also, the shaped bodies produced according to the inventive method have a similarly low tendency toward crack formation as the bodies shaped by wet-pressing. Magnets produced in accordance with the inventive method have good magnetic qualities, which are in no way inferior to magnets produced through wet-pressing without plastifying and bonding agents.

DESCRIPTION OF THE PREFERRED EMBODIMENTS

As already stated, the method according to the invention is suited especially for the production of magnets, in particular segmental magnets. Hard ferrites that can be used for this are, for example, barium ferrite ($BaFe_2O_4$) and especially strontium ferrite ($SrFe_2O_4$). Other hard ferrites suitable for the production of magnets can also be used. The hard ferrites are generally used as a powder with medium particle size in the range of 5 to 20 μm. The powders are produced in the standard way, for example by grinding, e.g. in vibration grinding or ball-type mills, of the mixed oxides that are precipitated out of watery solutions and are commercially available.

The use of (a) cyclododecane, cyclododecanol and/or stearyl alcohol together with (b) stearic acid as plastifying and bonding agent represents an essential feature of the invention at hand. The stearic acid in this case probably acts as dispersing agent for the hard ferrites. The optimum amount of the plastifying and bonding agent depends on the type of hard ferrite used as well as its average particle size and can be determined easily through orienting experiments. In general, the amount of plastifying agent used is 0.1 to 30 percent in weight and preferably 1 to 25 percent in weight as referred to the weight of the hard ferrite powder. When using the combination of components (a) and (b) according to the invention, the required total amount of plastifying and bonding agents as compared to an equally effective amount of only one of the components can be lowered considerably. That is one of the reasons why, as already stated, the removal according to the invention of the plastifying and bonding agents from the blank can occur quickly while still in a careful manner. The quantitative composition of the two components (a) and (b) can vary widely within limits. In general, weight ratios of 95:5 to 5:95 are used. It is advisable to use a weight ratio of about 65:35. If a mixture of two of the above-named materials or of all three materials is used for component (b), then these materials can have optional mixture ratios, even those where the materials do not form single-phase mixtures.

Prior to producing the blanks, the hard ferrite powder and the plastifying and bonding agent components are mixed homogeneously. This can happen in an optional sequence, for example by mixing all three materials at the same time or by adding the two other materials successively to one of the three materials. For the mixing operation, the standard apparatuses are suitable, which exert a sufficient shear action on the materials to be mixed, for example a trough kneader, SIGMA kneader etc. Increased temperatures, for example from 50 to 150° C. promote the mixing.

The resulting mixture is then shaped through injection-molding, extruding (extrusion) or advantageously through pressing into blanks. It is useful if this takes place in an orienting magnetic field with a field strength of >600 kA/m. The removal of the plastifying and bonding agent from the blanks takes place at temperatures that range advisably up to about 650° C. and in an oxygen-containing atmosphere, preferably air. The optimum rate of increase for the temperature and the duration of the heating depend, among other things, on the layer thickness of the formed bodies and can again be determined without difficulty through orienting experiments. One starts with the room temperature and increases the temperature in general by 1 to 100K/min. As a rule, the plastifying and bonding agent is largely removed after 10 to 120 hours so that the blanks can be sintered.

The blanks without bonding agent can be sintered in a way that is known per se. It is useful if the removal of the bonding agent and the sintering are combined into one operation in the same oven, for example, by heating the blanks in an oxygen-containing atmosphere, such as air, gradually to 1200 to 1350° C. and by holding them at this temperature for 10 to 30 minutes. In doing so, it is advisable if the temperature is increased at a rate of 20 to 40K/min in the range between 20° C. to about 600° C. and at a rate of 200 to 400K in the range of about 600° C. to the peak temperature.

EXAMPLE 850 g of a commercially available strontium ferrite, 100 g cyclododecane and 50 g stearic acid are mixed for 1 hour at 70° C. in a kneader. Following the cooling down, the mixture is granulated and ground in a cutting mill. The ground mixture is pressed at 80° C. to 5 mm-thick magnet segments. The plastifying and bonding agent is removed and the blanks without bonding agent are sintered in a single processing step. To do this, the blanks are kept inside an air-washed electric oven and are heated with a rate of increase for the temperature of 30K/h from 20° C. to 600° C. and with a rate of increase for the temperature of 300K/h to 1,250° C. and are kept at this temperature for 15 minutes.

Following the cooling down, the sintered bodies were free of cracks and showed the following magnetic qualities:

residual magnetism: Br 380 mT coercive field strength: 350 kA/m

Corresponding results are obtained when forming the mixture of strontium ferrite powder and plastifying and bonding agents by extruding it.

What is claimed is:

1. A method for producing a shaped body from hard ferrites, comprising:
   a. providing a powder of hard ferrite material having a fine particle size;
   b. adding to the powder a mixture comprising (a) a plastifying agent which is at least one of cyclododecane, cyclododecanol, and stearyl alcohol and (b) a bonding agent which is stearic acid;
   c. shaping the mixture into a blank;
   d. heating the blank at a temperature effective to remove the plastifying agent and the bonding agent from the blank; and
   e. subsequently heating the blank to a temperature effective to sinter the powder.

2. The method according to claim 1, wherein the mixture of the plastifying agent and the bonding agent is added in an amount ranging from 0.1 to 30 weight % based on the weight of the powder.

3. The method according to claim 1, wherein the mixture consists essentially of from 0.1 to 20 weight % of at least one of cyclododecane, cyclododecanol, and stearyl alcohol based on the weight of the powder; and from 0.1 to 15 weight % of stearic acid based on the weight of the powder.

4. The method according to claim 1, wherein the plastifying agent is present in an amount which is greater than that of the bonding agent.

5. The method according to claim 1, wherein the plastifying agent and the bonding agent are present in a weight ratio of plastifying agent to bonding agent which ranges from 95:5 to 65:35.

6. The method according to claim 5, wherein the plastifying agent and the bonding agent are present in a weight ratio of plastifying agent to bonding agent which is 65:35.

7. The method according to claim 1, wherein the powder of hard ferrite material has a particle size ranging from 5 to 20 µm.

8. The method according to claim 1, wherein the shaped body is magnet which are one of isotropic or anisotropic.

9. The method according to claim 1, wherein the shaped body is magnet which are one of isotropic or anisotropic and which is segmental.

10. The method according to claim 1, wherein shaping the mixture in step (c) is accomplished in a magnetic field by one of injection-molding, extruding, or pressing.

11. A method for producing a shaped body from hard ferrites, comprising:
   a. providing a powder of hard ferrite material having a fine particle size;
   b. adding to the powder a mixture consisting essentially of (a) a plastifying agent which is at least one of cyclododecane, cyclododecanol, and stearyl alcohol and (b) a bonding agent which is stearic acid;
   c. shaping the mixture into a blank;
   d. heating the blank at a temperature effective to remove the plastifying agent and the bonding agent from the blank; and
   e. subsequently heating the blank to a temperature effective to sinter the powder.

12. The method according to claim 11, wherein the mixture of the plastifying agent and the bonding agent is added in an amount ranging from 0.1 to 30 weight % based on the weight of the powder.

13. The method according to claim 11, wherein the mixture consists of:
   from 0.1 to 20 weight % of at least one of cyclododecane, cyclododecanol, and stearyl alcohol based on the weight of the powder; and
   from 0.1 to 15 weight % of stearic acid based on the weight of the powder.

14. The method according to claim 11, wherein the powder of hard ferrite material has a particle size ranging from 5 to 20 µm.

15. The method according to claim 11, wherein the plastifying agent is present in an amount which is greater than that of the bonding agent.

16. The method according to claim 11, wherein the plastifying agent and the bonding agent are present in a weight ratio of plastifying agent to bonding agent which ranges from 95:5 to 65:35.

17. The method according to claim 16, wherein the plastifying agent and the bonding agent are present in a weight ratio of plastifying agent to bonding agent which is 65:35.

18. The method according to claim 11, wherein the shaped body is magnet which is one of isotropic or anisotropic.

19. The method according to claim 11, wherein the shaped body is magnet which is one of isotropic or anisotropic and which is segmental.

20. The method according to claim 11, wherein shaping the mixture in step (c) is accomplished in a magnetic field by one of injection-molding, extruding, or pressing.

21. A method for producing a sintered body useable as an anisotropic permanent magnet from hard ferrites, comprising the steps of:
   a) preparing a homogenous mixture comprised of i) a magnetizable ferrite powder, ii) at least one plastifying agent selected from the group consisting of cyclododecane, cyclododecanol, and stearyl alcohol, and iii) stearic acid;
   b) preparing a green body from the mixture;
   c) removing plastifying agent and stearic acid from the green body; and
   d) sintering the green body.

22. The method of claim 21, wherein a magnetic field is applied to orient the ferrite particles.

23. The method of claim 22, wherein heat is applied while the ferrite particles are being oriented.

24. The method of claim 23, wherein heat is applied while the green body is being shaped.

25. The method of claim 21, wherein the green body is shaped in the absence of added water.

26. The process of claim 21, wherein the sintered green body of step d) substantially has a shape for the anisotropic permanent magnet.

* * * * *